Patented July 6, 1954

2,683,175

UNITED STATES PATENT OFFICE 2,683,175

PROCESS FOR PRODUCTION OF ALPHA-HYDROXYBUTYRALDEHYDES

Chester M. Himel, Palo Alto, Calif., and Lee O. Edmonds, Bartlesville, Okla., assignors to Phillips Petroleum Company, a corporation of Delaware No Drawing. Application September 16, 1949, Serial No. 116,224

10 Claims. (Cl. 260—602)

The present invention relates to the preparation of an alpha-hydroxybutyraldehyde. In one of its aspects the invention relates to the preparation of an alpha-hydroxybutyraldehyde containing at least four carbon atoms. In another of its aspects the invention relates to the preparation of an alpha-hydroxybutyraldehyde from its corresponding alkenediol. In another of its aspects, still, the invention relates to a process for the catalytic isomerization of an alkene-1,2-diol to a corresponding alpha-hydroxybutyraldehyde. Yet, in another of its aspects the invention relates to the isomerization of an alkenediol, for example, 3-butene-1,2-diol, to its corresponding alpha-hydroxybutyraldehyde, to wit: alpha-hydroxybutyraldehyde itself, by a catalytic process of isomerization under certain conditions including the employ of a hydrogenation-type catalyst.

Hydroxyaldehydes are an important group of compounds which have numerous uses in the chemical industry. They possess in one molecule the properties of aldehydes and alcohols and are intermediates for the production of valuable chemical compounds.

We have now discovered a process for the production of alpha-hydroxyaldehydes containing at least four carbon atoms wherein the corresponding alkene-1,2-diols are catalytically isomerized to form the said alpha-hydroxyaldehydes. The products prepared by our process are compounds having the general formula

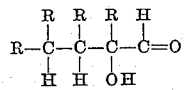

wherein the R's may be hydrogen or alkyl groups but are so chosen that the total of all the carbon atoms in all of such substituent groups taken together shall not exceed six.

According to this invention an alkenediol, having the formula

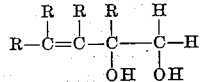

wherein the R's are as above stated, is treated under isomerization conditions of temperature, pressure and time, with a hydrogenation-type catalyst to form the corresponding alpha-hydroxybutyraldehyde.

Given that an aforesaid hydrogenation-type catalyst will cause the isomerization of an alkenediol, as above-identified, to form the corresponding alpha-hydroxybutyraldehyde, one skilled in the art can determine by mere routine test the conditions at which any particular alkenediol will isomerize to the corresponding alpha-hydroxybutyraldehyde.

In an embodiment of the present invention the conditions are so adjusted that the isomerization product can be distilled and collected as formed. It can be used as collected or purified, for example, by distillation.

The alkenediols used as starting material in the process of this invention can be obtained by hydroxylating a corresponding conjugated diolefin, or in any other suitable manner.

To more fully set forth the process of the invention and to aid in its application certain of its features are now elaborated.

Catalysts of the hydrogenation-type which can be used are, for example, palladium-on-charcoal, Raney nickel, copper-chromite and the like. About one-tenth to about five per cent, by weight of the alkenediol charged to the reactor, of palladium-on-charcoal has been found to be especially adapted to the process of the invention. Usually from about one-tenth to about ten per cent, preferably about two to about seven per cent, of the catalyst, by weight of the alkenediol charged, will be found to yield the product of the process of the invention.

Reaction temperatures usually will be in the range from about 90 to 170° C. preferably from about 105 to 150° C. Pressures will be preferably in the range from 10 to 100 mm. Hg absolute although pressures somewhat above or below these values may be employed if desired.

As described above, our process may be carried out in a batchwise manner. The process is also adaptable to continuous operation and such operation is considered to be within the scope of the invention.

While we have generally preferred to operate according to the process as described, we have found that appreciable yields of alpha-hydroxybutyraldehyde are obtained by treatment of a solution of 3-butene-1,2-diol with hydrogen in the presence of a palladium-on-charcoal catalyst at a temperature between 10 and 90° C., preferably between 10 and 30° C. The diol is dissolved in a suitable solvent, such as, for example, ethanol in a ratio preferably not greater than 50 ml. of solvent per mol of diol. Larger amounts of solvent may be employed; however, when so operating, yields are correspondingly decreased. This embodiment of our process is based on the use of a palladium catalyst only, other hydrogenation catalysts leading to hydrogenation of the diol without isomerization.

*Example I*

A run was made wherein one-half mol of 3-butene-1,2-diol was charged to a reactor with 5.0 per cent by weight of palladium-on-charcoal catalyst. The pressure of the system was reduced to about 30 mm. and the temperature raised to 130° C. at which level the isomerization product distilled as formed. A substantially quantitative yield of a product was obtained which had a boiling point of 68° C. at 30 mm. and a refractive index of $N_D^{20}$ of 1.4250 and was identified as alpha-hydroxybutyraldehyde by tests which are described in the following examples.

*Example II*

A sample of the isomerization product from the run of Example I was hydrogenated over Raney nickel to provide a material having a boiling point of 68° C. at 0.4 mm. and a refractive index, $N_D^{20}$ of 1.4375. These values were identical with those for 1,2-butanediol prepared, both by hydroxylation of butene-1 and by hydrogenation of 3-butene-1,2-diol, thus indicating that hydrogenation of the isomerization product provided 1,2-butanediol. The identity of the three products thus obtained was further confirmed by their conversion to the corresponding bisphenylurethane derivatives, all of which melted at 116 to 117° C. No reduction in mixed melting points of these materials further established their identity. From these data it was apparent that the product contained a hydroxyl group on either the first or second carbon atom, thus establishing the compound as either alpha-hydroxybutyraldehyde ($CH_3CH_2CHOHCHO$) or 1-hydroxy-2-butanone ($CH_3CH_2C:OCH_2OH$).

Literature data on the physical constants of 1-hydroxy-2-butanone do not correspond with those of our isomerization product as shown in the following table

| Compound | Boiling Point | Refractive Index, $N_D^{20}$ |
|---|---|---|
| 1-Hydroxy-2-Butanone | 79–80° C. at 30 mm | 1.4185 |
| "Isomerization Product" | 68° C. at 30 mm | 1.4250 |

On the basis of the foregoing tests and literature data, the identity of the product was established as alpha-hydroxybutyraldehyde.

*Example III*

To further confirm the identity of the isomerization product as alpha-hydroxybutyraldehyde, the 2,4-dinitrophenyl hydrazone and the para-nitrophenyl hydrazone derivatives were prepared and are compared with literature data for the 2,4-dinitrophenyl hydrazone derivative of 1-hydroxy-2-butanone and the para-nitrophenyl hydrazone derivative of alpha-hydroxybutyraldehyde.

| | 2,4-dinitrophenyl hydrazone, M. P., °C. | p-nitrophenyl hydrazone, M. P., °C. |
|---|---|---|
| alpha-hydroxybutyraldehyde | | 135 |
| 1-hydroxy-2-butanone | 150 | |
| "Isomerization Product" | 120 | 135 |

Nitrogen analyses of these derivatives were as follows:

| Derivative | Nitrogen (Percent) | |
|---|---|---|
| | Calculated | Found |
| 2,4-dinitrophenyl hydrazone | 20.9 | 20.9 |
| p-nitrophenyl hydrazone | 18.8 | 18.6 |

Reasonable variation and modification are possible within the scope of the foregoing disclosure and the appended claims to the invention the essence of which is that an alkenediol can be isomerized to a corresponding alpha-hydroxybutyraldehyde under isomerization conditions in the presence of a metal catalyst of the hydrogenation-type.

We claim:

1. A process which comprises contacting a diol represented by the formula

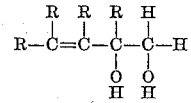

wherein the R's are selected from the group consisting of hydrogen and alkyl radicals and wherein the total of all of the carbon atoms in all of the R groups does not exceed six, with a catalyst consisting of palladium supported on charcoal, at a subatmospheric pressure and a temperature in the range 10 to 170° C., said contacting being conducted in the presence of hydrogen when said temperature within said range is below 90° C., and recovering an alpha-hydroxybutyraldehyde as a product of the process.

2. The preparation of an alpha-hydroxybutyraldehyde from an alkenediol, having the formula

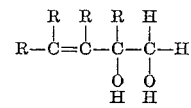

wherein the R's are selected from the group consisting of hydrogen and alkyl radicals and wherein the total of all of the carbon atoms in all of the R groups does not exceed six, which comprises subjecting said alkenediol to a temperature in the range 90–170° C. and under a reduced pressure to the action of a metal catalyst of the hydrogenation type selected from the group consisting of palladium-on-charcoal, Raney nickel and copper-chromite to form said alpha-hydroxybutyraldehyde.

3. The process of claim 2 wherein the pressure is in the range of 10–100 mm. Hg absolute.

4. The process of claim 2 wherein the pressure is in the range of 10–100 mm. Hg absolute and the temperature is in the range 105–150° C.

5. The process of claim 2 wherein from about one-tenth to ten per cent, based on the weight of the alkenediol charged, of the catalyst is employed.

6. The preparation of an alpha-hydroxybutyraldehyde from an alkenediol, having the formula

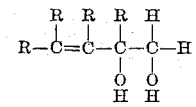

wherein the R's are selected from the group consisting of hydrogen and alkyl radicals and wherein the total of all of the carbon atoms in all of the R groups does not exceed six, which comprises subjecting said alkenediol under isomerization conditions to the action of a palladium-on-charcoal catalyst at a temperature in the approximate range 90–170° C. and at a reduced pressure to form said alpha-hydroxybutyraldehyde.

7. The preparation of alphahydroxybutyraldehyde from 3-butene-1,2-diol which comprises subjecting it, disolved in a solvent, under a pressure of hydrogen, and under isomerization conditions, to the action of a palladium-on-charcoal catalyst at a temperature in the approximate range 10° to 90° C. and at a reduced pressure.

8. The process of claim 7 wherein the temperature is maintained in the approximate range 10° to 30° C.

9. The process of claim 7 wherein the solvent is ethanol and is employed in a ratio not greater than about 50 milliliters of solvent per mol of the diol.

10. A process for the conversion of 3-butene-1,2-diol to alpha-hydroxybutyraldehyde, which process comprises contacting said diol with a catalyst consisting of palladium supported on charcoal, at a reduced pressure and at a temperature in the range 10 to 170° C., said contacting being conducted in the presence of hydrogen when said temperature within said range is below 90° C.

References Cited in the file of this patent

UNITED STATES PATENTS

| Number | Name | Date |
|---|---|---|
| 2,010,076 | Groll et al. | Aug. 6, 1935 |
| 2,097,154 | Groll et al. | Oct. 26, 1937 |
| 2,333,216 | Trieschmann et al. | Nov. 2, 1943 |

OTHER REFERENCES

Berkman "Catalysis," Reinhold Publ. Co. (1940), pp. 820 and 876.